United States Patent [19]

Shelby

[11] 3,749,542
[45] July 31, 1973

[54] SEALING CONSTRUCTION FOR USE IN FORMING ARTICLES FROM STYRENE SHEET

[75] Inventor: Richard K. Shelby, Chicago, Ill.

[73] Assignee: Monsanto Company, St. Louis, Mo.

[22] Filed: Mar. 17, 1971

[21] Appl. No.: 125,437

Related U.S. Application Data

[60] Continuation of Ser. No. 795,750, Sept. 26, 1968, abandoned, which is a division of Ser. No. 534,441, March 15, 1966, Pat. No. 3,458,903.

[52] U.S. Cl.................. 425/388, 425/398, 425/416
[51] Int. Cl.............................................. B29c 1/02
[58] Field of Search................... 425/383, 388, 398, 425/416, 424; 264/89, 92

[56] References Cited
UNITED STATES PATENTS

| | | | |
|---|---|---|---|
| 2,944,995 | 7/1960 | Dosmann et al...................... | 260/41 |
| 3,023,187 | 2/1962 | Lo........................................ | 260/41 |
| 3,051,677 | 8/1962 | Rexford............................. | 260/29.6 |
| 3,088,938 | 5/1963 | Cluff................................. | 260/87.7 |
| 3,243,411 | 3/1966 | Tawney et al. ....................... | 260/61 |
| 3,424,710 | 1/1969 | Spaih..................................... | 260/41 |
| 2,120,328 | 6/1938 | Ferngren............................... | 264/94 |
| 2,478,165 | 8/1949 | Collins................................. | 425/388 |
| 3,319,295 | 5/1967 | Jones-Hinton et al............. | 425/388 |
| 3,342,914 | 9/1967 | Edwards ............................... | 264/89 |
| 3,458,903 | 8/1969 | Shelby ................................. | 425/424 |
| 3,616,495 | 11/1971 | Lemelson............................ | 425/155 |

Primary Examiner—R. Spencer Annear
Attorney—John Y. Upham and James C. Logomasini

[57] ABSTRACT

A pressure sealing ring which is adapted to be mounted upon rigid retaining rings in pressure applicators used in molding operations where the retaining ring receives gaseous pressure. The sealing ring comprises a linear copolymer of approximately 55 to 65 weight percent of vinylidene fluoride and approximately 45 to 35 weight percent hexafluoropropylene. The sealing ring engages a soft heated thermoplastic material and when gaseous pressure is applied to the retaining ring, a portion of the sealing ring moves radially outwardly to stretch the hot thermoplastic material.

3 Claims, 2 Drawing Figures

Patented July 31, 1973
3,749,542
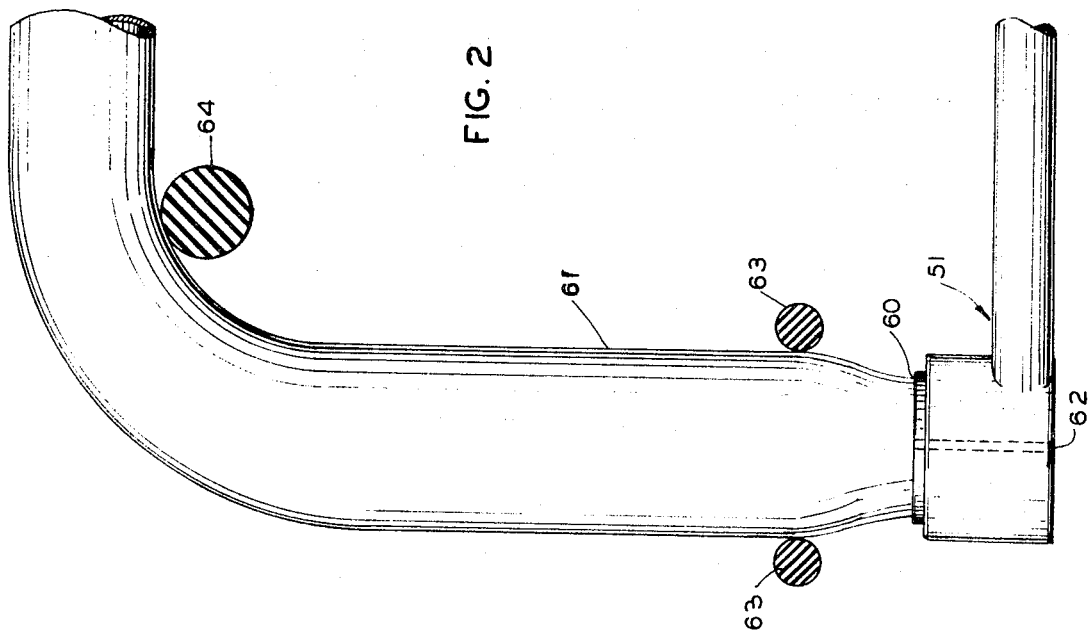
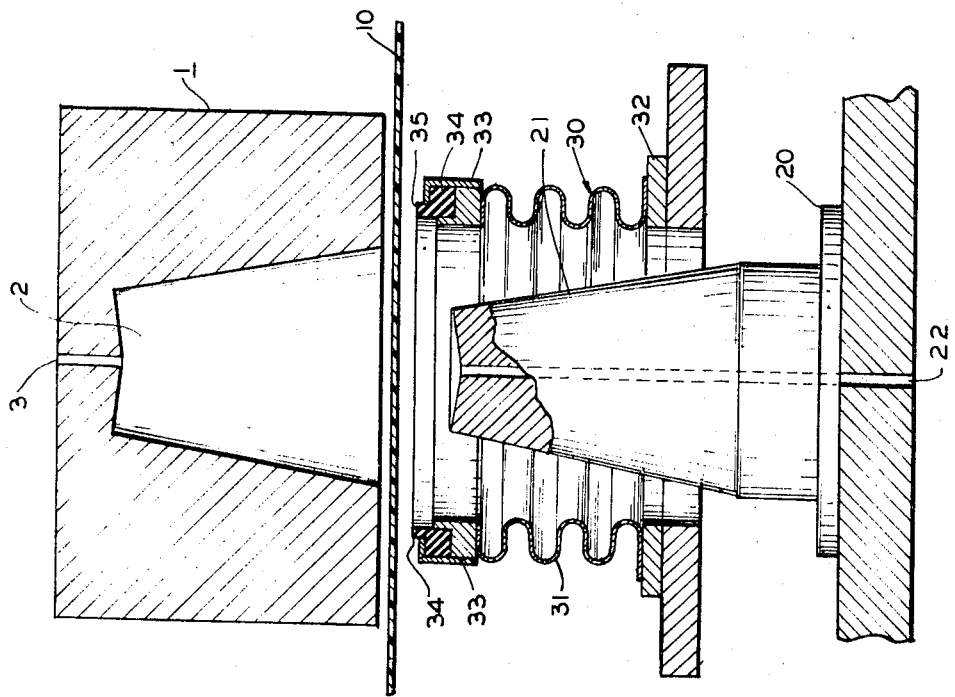
INVENTOR
RICHARD K. SHELBY
BY
*Robert J. Schaap*
ATTORNEY

SEALING CONSTRUCTION FOR USE IN FORMING ARTICLES FROM STYRENE SHEET

This application is a continuation of previously copending application Ser. No. 795,750, filed Sept. 26, 1968, now abandoned, which in turn was a division of application Ser. No. No. 534,441, filed Mar. 15, 1966, now U.S. Pat. No. 3,458,903.

This invention relates to a novel method and apparatus for forming thermoplastic articles, and more particularly to a method for applying a positive pressure of a fluid medium against the thermoplastic material in order to improve the forming operation.

It is a primary object of the present invention to provide a novel method and novel apparatus for the application of positive pressure to sheet-form, thermoplastic materials which are to be shaped as various types of containers, cups and the like.

Methods and apparatus have been heretofore known in the art for applying a vacuum to a heated sheet of thermoplastic material in order to shape such material into a desired form such as cups and various containers for example jars, bottles and fitments. Blowing processes are also known in which an internal fluid pressure is applied to a mass or web of thermoplastic material in order to shape the material into a desired from such as a continuous tubular film, bottle, and the like.

The present invention represents an advantage over prior knowledge in the coordination of botb positive and negative pressures applied on two sides of a sheet or web of thermoplastic material during the forming operation, particularly with regard to deep drawing operations. The present invention also makes it possible to make uniform thin-walled containers and other shapes without bursting the drawn material. Consequently, it is possible ti make lighter containers and to produce a larger number of containers from a given weight of the thermoplastic material. The thin-walled shaped products thus obtained have a more desirable appearance because of the uniformity of the wall as well as the base thicknes which also improves the heat transfer properties of the shaped objects, for example as a cup intended for hot liquids such as for hot coffee. The lighter weight of the product of the molding operation is of course an advantage in reducing costs for a given number of the shaped objects.

The present invention is based upon a flexible pressure applicator coordinating with a moving plunger to permit the imposition of a fluid pressure such as vacuum, air or steam pressure against a web of a thermoplastic material such as styrene. In the usual molding process, the web is forced into a die to receive the shape of the die, and it is also common to use a plug assist to aid in moving the web of material into the die.

It has been found that the formin1 operation is improved when a localized area of the thermoplastic web is subjected to a fluid pressure to force the thermoplastic web more uniformly and rapidly against the die surface.

A serious problem which has been encountered in the above described prior art fabrication method is that the heating of the thermoplastic material in order to form and shape the same causes the material to become very sticky while in the semifluid forming condition. The sticky material adheres readily to metal, wood and ordinary rubber gaskts ad sealin members used to control the application of vacuum or pressure.

The present invention overcomes the above-described problems of sticking of thermoplastic materials such as vinyl polymers, for eample polyvinyl chloride, styrene, and rubber modified polystyrene, as well as polyethylene, polypropylene and other hydrocarbon polymers. The problem of sticking of thermoplastic polymeric materials is overcome by providing contact surfaces of a specific substance which bear against such materials when under semifluid conditions. The novel contact material used in this relationship is constituted by linear copolymers of vinylidene fluoride with hexafluoropropylene, containing from 62 to 68 percent fluorine, preferably about 65 percent fluorine by weight. The copolymer of the present invention contains 55 to 65 weight percent of vinylidene fluoride and the remainder, namely 45 to 35 weight percent of hexafluoropropylene. This novel material, after copolymerization thereof may be partilly compounded with natural and sythetic rubber materials, but such additional polymeric materials should not be present in greater proportion than 50 percent by weight.

It has been found that this specific polymeric material is of unusual utility in the present application in providing a positive pressure or vacuum seal between rapidly moving mechanical parts, even at high operating temperatures. The polymeric material employed in the present relationship is a linear copolymer of vinylidene fluoride and hexafluoropropylene preferably containing about 65 percent fluorine. These monomers constitute the essential components of the copolymer, although minor proportons of other monomers may be present in the copolymerization. The copolymerization which is carried out by known means such as by the use of a peroxide catalyst, gives high yields.

The copolymer is fabricated into the desired as by methods well known in the elastomer art such a by the use of amine vulcanizing agents, e.g., in the proportion of from 0.5 to 5.0 percent by weight based upon the polymer and with carbon black employed in the proportion of from 0 to 50 percent by weight. The final shaping of the pressure and vacuum maintaining seal is carried out using a steel mold and a conventional curing temperature such as from 100° C to 200° C.

Apparatus which employs the above-described solid copolymer of vinylidene fluoride with hexafluoropropylene may take various forms as illustrated by various representative devices shown in the drawings forming a part of the present patent application. In the drawings, FIG. 1 shows a male and female die set for the production of shaped objects such as cups from a sheet of thermoplastic material, for example styrene. or pressure such corner In FIG. 1 illustrating a male and female die set for the fabrication of shaped objects such as cups from a sheet form of thermoplastic material such as polystyrene, the upper die 1 ontains a mold cavity 2 having a vent 3 to provide for the removal of air from the mold during the forming operation, r the application of pressure in order to aid in forming the cup. Element 10 represents the web of thermoplastic polystyrene which has been heated prior to admission to the mold. The male portion of the lower die 20 has a forming element 21 and is also provided with a vent 22 for the application of fluid pressuresuch as air pressure to control the forming operation and particularly for the purpose of achieving uniform wall thickness of the polystyrene. In order to seal the pressure during the forming operation, a positive pressure seal system 30, suitably actuated to coordinate with the lower die 20 holds a cylindrical bellows 31 by means of retaining rings 32 and 33. A sealing ring 34, or so-called "contact ring" of grossly rectangular cross section preferably has an upper lip 35 at the internal corner of the contact surface. The sealing ring 34 enables direct contact to be made against the hot web of thermoplastic material during the forming operation without incurring sticking of the thermoplastic material against the metallic and wooden members, such as forming element 21 which may suitably be made of a metal such as aluminum, or may be made of wood. The sealing ring 34 is made of the solid linear copolymer of vinylidene fluoride with hexafluoropropylene, containing about 65 percent fluorine.

The contact ring of the said copolymer also helps to stretch the web of thermoplastic material as it is gripped and stretched. In a preferred embodiment of the invention, the ring 34 has a cross section which is grossly rectangular, an with an upper lip at the internal corner of the remote surface of said rectangular cross section. Upon application of a fluid pressure, the said upper lip moves radially outwardly to stretch the said hot thermoplastic material. In another preferred embodiment the said ring also has a channel in the inside face of the cross section of the said rectangular ring, so that the channel can bear against a boss on the base to which the ring is secured. In this way the expansion of the said ring upon application of a fluid pressure pivots the circular sealing member about the said channel when the said channel bears against the said boss.

FIG. 2 illustrates an extrusion or blowing operation.

A continuously moving hollow tube of polyethylene is manufactured. The use of contact elements of the present linear polymer of vinylidene fluoride with hexafluoropropylene containing about 65 percent flourine solves the problem of sticking of the hot semifluid polyethylene product. In FIG. 2, extruder 51 is provided with a cylindrical orifice 60 from which formation of a continuous tube of polyethylene 61 leaves the machine.

Air vent 62 provides a positive pressure of air or other gaseous medium which maintains the desired tubular diameter of the extruded polyethylene. Guide rings 63 of the herein described copolymer of vinylidene fluoride with hexafluoropropylene permit controlling the high speed motion of the extruding tube without encountering sticking. After the tube 61 has traversed a suitable distance, and optionally has been subjected to cooling by means of an air stream, the polyethylene tube may be rolled over a pulley member 64 of the above-described solid linear polymer of vinylidene fluoride with hexafluoropropylene containing about 65 percent of fluorine without encountering sticking of the polyethylene product1

What is claimed is:

1. In apparatus for forming articles from heat softened, polymerized styrene thermoplastic sheet which includes a mold having a cavity conforming to the shape of the article, a plug for forcing a portion of the sheet into the cavity and a sealing device for holding a peripheral portion of the sheet in place during forming, the improvement which comprises a cylindrical ring on one end of the sealing device having a sheet contacting surface made of a copolymer comprising 55 to 65 weight percent vinylidene fluoride and 45 to 35 weight percent hexafluoropropylene, whereby the peripheral portion of said heat softened polymerized styrene sheet may be held in place by the ring of said sealing device without substantially sticking thereto.

2. The apparatus of claim 1 wherein said ring is rectangular in cross section and said sheet contacting surface includes a lip extending outwardly around the periphery thereof.

3. The apparatus of claim 2 wherein said cyindrical assembly includes a base member on which said sealing ring is mounted, said sealing ring being rectangular in cross section and having a channel on one surface for accepting a boss on said base member.

* * * * *